July 16, 1963
H. WEKSLER
3,097,530
COMBINATION THERMOMETER
Filed Oct. 7, 1959
3 Sheets-Sheet 1
FIG. 1
FIG. 2
FIG. 3
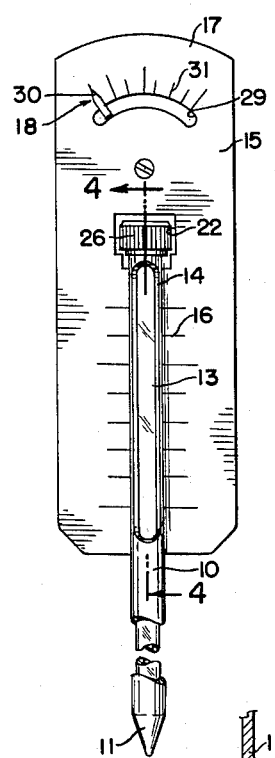
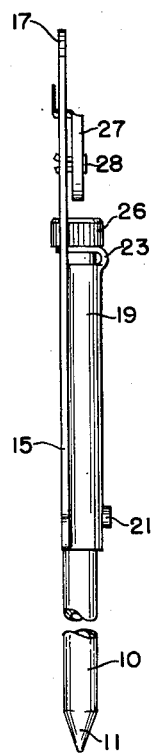
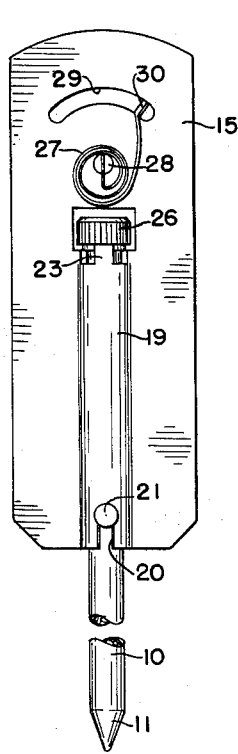
FIG. 4
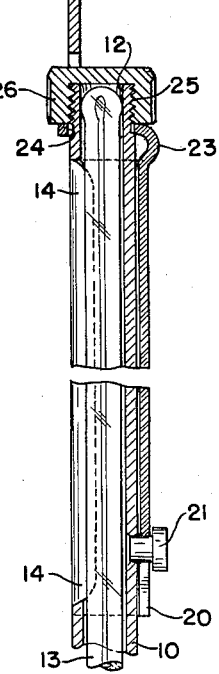
FIG. 5
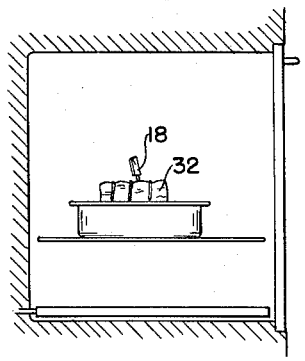
INVENTOR
HARRY WEKSLER
BY
ATTORNEYS July 16, 1963

H. WEKSLER 3,097,530

COMBINATION THERMOMETER

Filed Oct. 7, 1959

INVENTOR
HARRY WEKSLER

BY
Pennie, Edmonds, Morton, Barrows & Taylor
ATTORNEYS

July 16, 1963  H. WEKSLER  3,097,530
COMBINATION THERMOMETER
Filed Oct. 7, 1959  3 Sheets-Sheet 3

INVENTOR
HARRY WEKSLER
BY
ATTORNEYS

United States Patent Office 3,097,530
Patented July 16, 1963

3,097,530
COMBINATION THERMOMETER
Harry Weksler, Massapequa Park, N.Y., assignor to Weksler Instruments Corporation, Freeport, Long Island, N.Y., a corporation of New York
Filed Oct. 7, 1959, Ser. No. 844,943
2 Claims. (Cl. 73—340)

The present invention relates to thermometers, and more particularly to a novel combination thermometer assembly for indicating the temperature conditions within and immediately surrounding a roast, for example.

So-called roast thermometers are used conventionally in the preparation of roasts and the like. These thermometers comprise a suitable hollow probe, which is pointed at its lower end and which houses adjacent its lower end a bimetal element or the liquid bulb of a glass stem thermometer, for example. The indicating portion of the thermometer is exposed at the upper end of the device and provides a continuous indication of the temperature conditions within the roast. Although the conventional roast thermometer is a valuable adjunct in the cooking of meats, it is well recognized that the most important factor in the proper preparation of a roast is the temperature condition of the oven in the area immediately surrounding the roast.

Of course, modern ovens conventionally are provided with temperature regulating controls, but these are responsive to the temperature of a detecting element, usually located in a remote corner of the oven and, as often as not, may be inaccurate by as much as 25–50° F. In an attempt to achieve more accurate control over oven operations, a careful cook frequently utilizes a so-called oven thermometer, for example, which is placed or suspended in the oven and may provide a more reliable indication of oven temperature conditions. However, even the use of a conventional oven thermometer does not assure satisfactory results in roast preparations, since the thermometer may or may not be in the vicinity of the roast, and its position relative to the roast will vary from time to time if the position of the roast is changed at all during cooking.

In accordance with the present invention, an oven thermometer is mounted on a probe, for insertion directly in the roast, so that the oven thermometer always is positioned in the immediate vicinity of the roast. In addition, the probe upon which the oven thermometer is supported contains the sensing portion of a meat thermometer, for indicating temperature conditions within the roast. Thus, with a single instrument, inserted in and supported by the roast, temperature conditions immediately surrounding, as well as within, the roast may be ascertained.

Although the improved instrument of the invention may take a variety of forms, one of the more advantageous of these forms incorporates a shield, mounted at the upper end portion of the meat probe, which includes indicia for the roast thermometer and serves as a mounting for, and contains the indicia of, the oven thermometer. In another advantageous form of the invention, the oven thermometer is mounted at the top of the probe and, if the roast thermometer is of the type including a bimetal sensing element, both thermometers advantageously are mounted in a sealed housing at the top of the probe.

For a better understanding of the invention and of the above and other advantageous features thereof, reference should be made to the following detailed specification and to the accompanying drawings, in which:

FIGS. 1–3 are front, side and back elevational views, respectively, of one form of the new combination thermometer;

FIG. 4 is an enlarged, fragmentary, cross-sectional view taken generally along line 4—4 of FIG. 1;

FIG. 5 is a simplified representation of the combination thermometer of FIGS. 1–4 in use;

Figure 8:
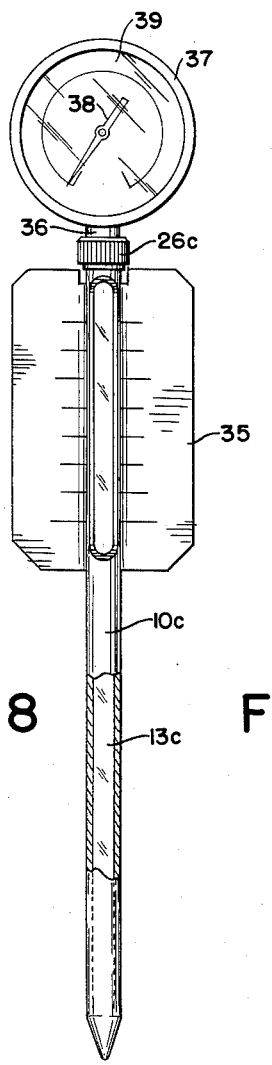
FIGS. 6–8 are front elevational views of modified forms of the new combination theremometer, wherein the roast thermometers are of the glass stem type.

Referring now to the drawings, and initially to FIGS. 1–4 thereof, the reference numeral 10 designates a probe, advantageously formed of tubular, heat-conducting material, such as aluminum. The probe 10 is closed and pointed at its lower end 11 and open at its upper end 12. The internal dimensions of the probe 10 are such as to receive substantially completely therein a glass stem thermometer 13, with the lower or sensing portion of the thermometer being located substantially at or adjacent the pointed lower end 11 of the probe. The upper portion of the probe 10 has a cut-out 14 extending longitudinally, from a point slightly below the upper end of the probe, to expose the upper portion of the thermometer 13 and permit observation of the level of the expandable liquid therein. In accordance with usual practice, the lower end of the thermometer 13 is in good heat-conducting relation with the lower end of the probe 10, so that, when the probe is inserted in a roast, temperature conditions surrounding the lower end of the probe are transmitted to the sensing portion of the thermometer and registered by the level of the liquid along the cut-out portion 14.

In the form of the invention illustrated in FIGS. 1–4, a flat shield 15 is supported by the upper portion of the probe 10 and includes suitable indicia 16 for cooperation with the roast thermometer 13. In addition, the upper portion 17 of the shield mounts and provides indicia for a second or oven thermometer 18. Advantageously, the shield 15 is stamped to provide a generally semi-cylindrical portion 19 adapted partially to envelop the upper portion of the probe 10. The lower end of the semi-cylindrical portion 19 is provided with a longitudinal slot 20 which interlockingly engages with a headed pin 21 mounted at the back of the probe 10. The pin 21 locates the shield 15 vertically and also prevents relative rotation between the probe and the shield, so that the shield is held in a desired, fixed relation with respect to the cut-out portion 14 of the probe.

Adjacent the top of the semi-cylindrical portion 19 of the shield there is provided a cut-out portion 22 which, when the shield and probe are assembled, is located adjacent the upper end of the probe. A tab 23, integral with the shield portion 19 but bent at right angles thereto, projects forward through the opening 22 and has a circular opening 24 adapted to receive the upper portion of the tubular probe 10. As shown best in FIG. 4, the upper portion of the probe 10 is threaded, as at 25, and the tab 23 advantageously is arranged to lie adjacent the base portion of the threads 25. A combined cap and locking member 26, received in the opening 22, is engaged threadedly with the upper portion of the probe, closing off the open upper end thereof, and bearing downward upon the tab 23. When the cap 26 is tightened upon the upper end of the probe 10, the shield 15 is urged downward with respect to the probe, so that the shield is locked in place securely between the cap 26 and the headed pin 21.

In accordance with one aspect of the invention, the upper portion 17 of the shield mounts an oven thermometer 18 in a position such that, when the probe 10 is inserted in a roast, the thermometer 18 will, at all times, be located in the immediate vicinity of the roast, in a position to indicate the critical temperature of the area surrounding the roast. In the first illustrated form of the invention, the oven thermometer 18 comprises a bimetallic coil 27 located at the back of the shieuld and anchored thereto by a slotted pin 28. The pin 28 is rotatable, for calibrating purposes, but is otherwise fixed to the shield. The shield 15 is provided with an arcuate slot 29, through which projects an indicator 30 fixed to the outer end of the bimetallic element and movable along the arcuate slot in accordance with the temperature sensed by the element 27. The shield 15 is also provided with appropriate indicia 31 adjacent the slot 29, so that the position of the indicator 30 along the slot 29 affords a direct reading of the temperature sensed by the element 27.

When the new combination thermometer is in operation, the probe 10 thereof is inserted into the center of a roast 32, as indicated in FIG. 5. The roast thermometer 13 is thus enabled to sense and record the temperature conditions within the roast and, at the same time, the oven thermometer 18 is supported by the roast, in the immediate vicinity thereof, to afford an indication of the critical temperature of the air surrounding the roast. In this respect, it will be understood that the oven thermometer 18 retains its operative relation to the roast, even though the roast may be moved several times during the cooking thereof, for basting or other purposes. The combined instrument thus is of great value to the cook, in providing correlated indications of interior and exterior temperature conditions, conveniently ascertainable in a single viewing, and enabling the cook to maintain precise control over the progress of the cooking operation.

Figure 6:
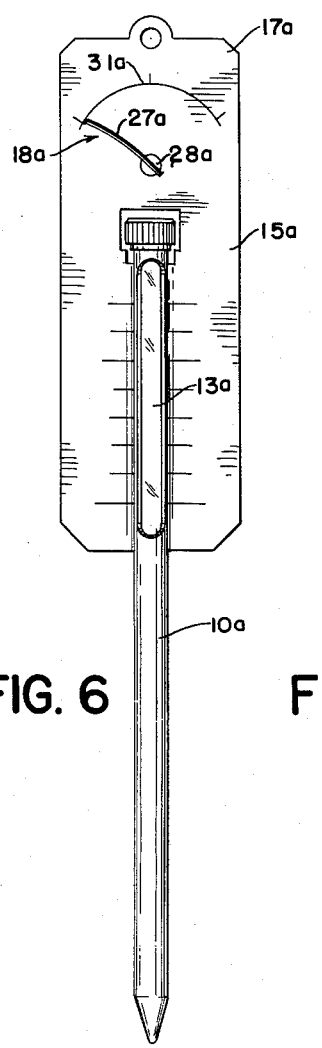

In the form of the invention shown in FIG. 6, a shield 15a is mounted at the upper end of a probe 10a housing a roast thermometer 13a substantially as before described. The upper portion 17a of the shield mounts an anchor pin 28a, which is rotatable for calibrating purposes but otherwise fixed to the shield, and which mounts a bimetal element 27a. The bimetal element 27a is mounted on the front side of the shield and cooperates with scribed indicia 31a, the end of the bimetal element serving as a pointer in cooperation with the indicia.

Figure 7:
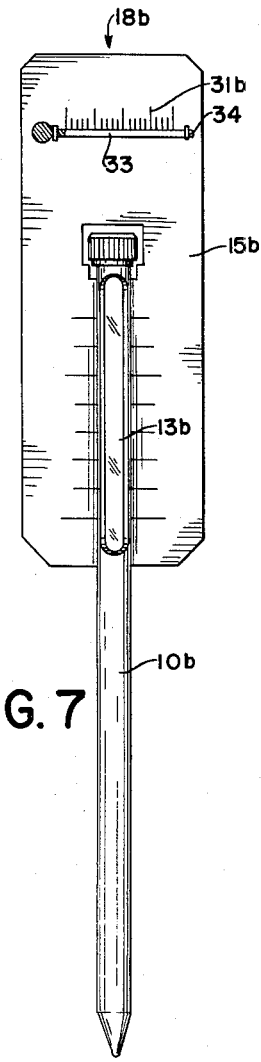

In the form of the invention shown in FIG. 7, the oven thermometer 18b is in the form of a glass stem thermometer 33 mounted horizontally on the shield 15b, substantially directly above the end of the probe 10b housing the roast thermometer 13b. Appropriate indicia 31b are scribed in the shield, for cooperation with the thermometer 33 for accurate temperature reference. Light spring clips 34 may be utilized to secure the thermometer 33 to the shield in the desired manner.

In the form of the invention shown in FIG. 8, a shield 35 is mounted at the upper end of the probe 10c, housing a glass stem thermometer 13c. The shield 35, which is mounted on the probe 10c substantially as described in connection with the embodiment of FIGS. 1-4, terminates at or near the upper end of the probe 10c. A threaded cap 26c is secured to the upper end of the probe 10c and has an upward extension 36 mounting a sealed housing 37. The housing 37 encases a suitable oven thermometer 38, advantageously of the bimetal-actuated type, and a dial 39 is provided with suitable indicia, registering oven temperature in accordance with the rotational position of the pointer of the thermometer.

Figure 9:
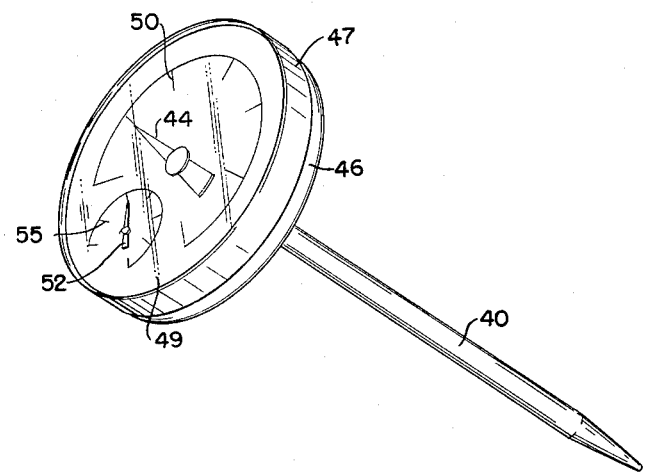
FIGS. 9, 10 are perspective and longitudinal cross-sectional views, respectively, of a further modified form of the new combination thermometer, wherein both the roast and oven thermometers include bimetal sensing elements.
Figure 10:
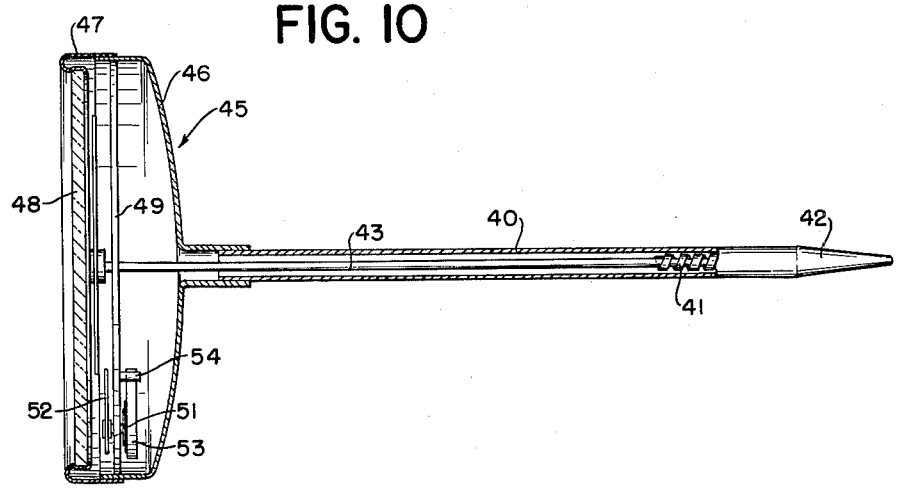

In the form of the invention shown in FIGS. 9 and 10, a probe 40 receives a spiral bimetal element 41 adjacent its pointed lower end 42. One end of the bimetal is anchored to a shaft 43 which extends through the probe and beyond the open end thereof and has secured thereto an indicating pointer 44. Mounted at the upper end of the probe 40, and serving to seal the entire structure, is a sealed housing 45, consisting of a base part 46, a supporting rim 47 and a transparent cover glass 48. A dial plate 49 is mounted in the base housing part 46 and has suitable indicia 50 on its outer surface for cooperation with the pointer 44. In addition, the dial plate 49 journals the shaft 51 of a second indicating pointer 52 actuated by a bimetal element 53 received within the sealed housing. The bimetal 53 is appropriately anchored to the dial plate 49, as by a pin 54 and, in response to changes in temperature, rotates the pointer 52 with respect to the dial face 49. Suitable indicia 55, cooperating with the pointer 52, permit easy reading of oven temperature when the device is in use.

The form of the invention shown in FIGS. 9 and 10, being completely sealed, is advantageous in that the working parts thereof remain clean at all times, and the exterior of the unit is easily cleaned after each use. Advantageously, the exterior metal parts are formed of stainless steel, for example, so that the unit is substantially inert to food acids, etc. In addition, being completely sealed and of smooth contours, it can be cleaned and sterilized by immersion in boiling water, for example.

In all forms of the invention, means are provided for mounting an oven thermometer directly upon the probe of a roast thermometer, for determination of the temperature in the area immediately surrounding the roast. Being mounted directly upon the roast, the oven thermometer maintains the same operative relation to the roast throughout the cooking process, regardless of whether the roast is adjusted in the oven, so that the conditions under which a roast is cooked may be controlled with substantial accuracy. The oven and roast thermometers are not only disposed side by side for easy visual reference, but the sensing probe for the roast thermometer provides a proper support for the oven thermometer, to maintain it in the desired position relative to the roast.

It should be understood, however, that the specific forms of the invention herein illustrated and described are intended to be representative only, as certain changes may be made therein without departing from the clear teachings of the disclosure. By way of example, it may be desirable or expedient in some cases to omit the tubular probe element, as shown in the embodiments of FIGS. 1-8, and utilize the glass stem thermometer 13 itself as a probe. Accordingly, reference should be made to the following appended claims in determining the full scope of the invention.

I claim:

1. A combination oven and roast thermometer comprising probe means constructed for insertion in a roast, and carrying at its upper end first means for indicating the temperature within a roast and second means mounted on the upper end of said probe means for indicating the temperature of the oven area immediately surrounding a roast, said probe means including a hollow tube and an elongated glass stem thermometer received within the tube, said first means including a portion of said glass thermometer exposed at the upper end of the tube, an indicating shield mounted at the upper end of the tube in cooperative association with said glass thermometer, said second means including a second thermometer mounted on said shield and exposed to the area surrounding said shield, said shield having an upper portion which extends above the upper end of the tube and first thermometer, the second thermometer being mounted on the upper portion of the shield and comprising a bi-metal element anchored at the back of the upper portion of the shield and having an indicating portion projecting through a slot in the shield visible from the front side thereof.

2. A combination oven and roast thermometer comprising probe means constructed for insertion in a roast, and carrying at its upper end first means for indicating the temperature within a roast and second means mounted on the upper end of said probe means for indicating the temperature of the oven area immediately surrounding a roast, said probe means including a hollow tube and an elongated glass stem thermometer received within the tube, said first means including a portion of said glass thermometer exposed at the upper end of the tube, an indicating shield mounted at the upper end of the tube in cooperative association with said glass thermometer, said second means including a second thermometer mounted on said shield and exposed to the area surrounding said shield, said shield having an upper portion which extends above the upper end of the tube and first thermometer, the second thermometer being mounted on the upper portion of the shield and comprising a bi-metal element anchored at the front of the upper portion of the shield and cooperating with indicia provided thereon.

References Cited in the file of this patent

UNITED STATES PATENTS

| | | |
|---|---|---|
| 1,325,547 | Wheeler | Dec. 23, 1919 |
| 1,485,013 | Blakeslee | Feb. 26, 1924 |
| 1,692,551 | Harris | Nov. 20, 1928 |
| 2,007,324 | Budgett | July 9, 1935 |
| 2,189,123 | Barker | Feb. 6, 1940 |
| 2,276,178 | Ford | Mar. 10, 1942 |

FOREIGN PATENTS

| | | |
|---|---|---|
| 788,179 | Great Britain | Dec. 23, 1957 |